United States Patent
Ewe et al.

(10) Patent No.: US 9,888,088 B2
(45) Date of Patent: *Feb. 6, 2018

(54) METHOD AND APPARATUS FOR ACCESSING AN ENTERPRISE RESOURCE PLANNING SYSTEM VIA A MOBILE DEVICE

(71) Applicant: SYNACTIVE, INC., Foster City, CA (US)

(72) Inventors: Thomas Ewe, San Francisco, CA (US); Onur Pekerten, Istanbul (TR); Lin Ma, Sunnyvale, CA (US)

(73) Assignee: SYNACTIVE, INC., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/601,737

(22) Filed: May 22, 2017

(65) Prior Publication Data

US 2017/0257451 A1   Sep. 7, 2017

Related U.S. Application Data

(63) Continuation of application No. 15/236,295, filed on Aug. 12, 2016, now Pat. No. 9,661,096, which is a (Continued)

(51) Int. Cl.
*H04L 29/08* (2006.01)
*G06F 17/30* (2006.01)
(Continued)

(52) U.S. Cl.
CPC .... *H04L 67/2823* (2013.01); *G06F 17/30893* (2013.01); *G06Q 10/06* (2013.01);
(Continued)

(58) Field of Classification Search
CPC ......... H04L 65/00; H04L 65/40; H04L 67/00; H04L 67/02; H04L 67/2823
See application file for complete search history.

(56) References Cited

U.S. PATENT DOCUMENTS 6,058,375 A   5/2000 Park
6,108,309 A   8/2000 Cohoe et al.
(Continued)

FOREIGN PATENT DOCUMENTS

KR   1020010043107 A   5/2001
KR   1020080024617 A   3/2008
(Continued)

OTHER PUBLICATIONS

Communication pursuant to Article 94(3) EPC dated May 31, 2017 for European Patent Application No. 13822813.5, in 10 pages.
Communication pursuant to Article 94(3) EPC received in European patent application No. 13822813.5, dated Nov. 21, 2016, 10 pages.
Extended European Search Report received in European patent application No. 13822813.5, dated Feb. 29, 2016, 11 pages.
(Continued)

*Primary Examiner* — Lashonda Jacobs
(74) *Attorney, Agent, or Firm* — Procopio Cory Hargreaves and Savitch LLP; Pattric Rawlins; Ernest Huang

(57) ABSTRACT

A method and apparatus for accessing an enterprise resource planning system via a mobile device is described. In one embodiment, the method includes parsing data from a host application access application into at least one object in an application-specific format, converting the data into an intermediate format that is compatible with a mobile device and communicating the converted data to the mobile device.

18 Claims, 3 Drawing Sheets

Related U.S. Application Data continuation of application No. 14/981,492, filed on Dec. 28, 2015, now Pat. No. 9,420,054, which is a continuation of application No. 14/667,583, filed on Mar. 24, 2015, now Pat. No. 9,225,804, which is a continuation of application No. 13/083,988, filed on Apr. 11, 2011, now Pat. No. 8,990,427.

(60) Provisional application No. 61/342,372, filed on Apr. 13, 2010.

(51) Int. Cl.
*H04L 29/06* (2006.01)
*H04M 1/725* (2006.01)
*G06Q 10/06* (2012.01)

(52) U.S. Cl.
CPC ............. *H04L 67/02* (2013.01); *H04L 69/08* (2013.01); *H04M 1/72563* (2013.01); *H04L 65/00* (2013.01); *H04L 65/40* (2013.01)

(56) References Cited

U.S. PATENT DOCUMENTS

| | | | |
|---|---|---|---|
| 6,397,220 | B1 | 5/2002 | Deisinger et al. |
| 6,760,745 | B1 | 7/2004 | Tan et al. |
| 6,822,663 | B2 | 11/2004 | Wang et al. |
| 6,970,823 | B1 | 11/2005 | Yago et al. |
| 6,993,712 | B2 | 1/2006 | Ramachandran et al. |
| 7,093,195 | B2 * | 8/2006 | Lynch ................ G06F 17/227 707/999.101 |
| 7,137,127 | B2 | 11/2006 | Slotznick |
| 7,151,438 | B1 * | 12/2006 | Hall .................. G06Q 10/10 340/286.06 |
| 7,234,111 | B2 | 6/2007 | Chu et al. |
| 7,278,110 | B1 | 10/2007 | Wugofski |
| 7,386,485 | B1 | 6/2008 | Mussman et al. |
| 7,480,867 | B1 | 1/2009 | Racine et al. |
| 7,493,591 | B2 | 2/2009 | Charisius et al. |
| 7,565,381 | B2 * | 7/2009 | Oswalt ................ G06Q 10/06 |
| 7,568,167 | B2 | 7/2009 | Van Dok et al. |
| 7,577,601 | B1 | 8/2009 | Rademacher et al. |
| 7,752,299 | B2 | 7/2010 | Bookman et al. |
| 7,792,784 | B2 | 9/2010 | Gupta |
| 7,805,523 | B2 | 9/2010 | Mitchell et al. |
| 7,809,600 | B1 * | 10/2010 | Como ................ G06Q 10/06 705/1.1 |
| 7,899,763 | B2 | 3/2011 | Machulsky et al. |
| 7,970,943 | B2 | 6/2011 | Lin et al. |
| 8,010,605 | B2 | 8/2011 | Chang |
| 8,078,731 | B1 * | 12/2011 | Bruder ............. H04L 67/2823 709/227 |
| 8,166,130 | B2 * | 4/2012 | Reinart ............... G06F 9/541 700/97 |
| 8,201,143 | B2 | 6/2012 | Reamey |
| 8,214,409 | B2 * | 7/2012 | O'Farrell .............. G06F 8/20 707/802 |
| 8,271,031 | B2 * | 9/2012 | Boskovic .......... H04L 67/2823 455/556.1 |
| 8,306,862 | B2 * | 11/2012 | Weiler .............. G06Q 10/087 705/20 |
| 8,365,144 | B1 | 1/2013 | Webb |
| 8,370,751 | B2 | 2/2013 | Graeff et al. |
| 8,429,286 | B2 * | 4/2013 | Pantos ................ H04L 67/06 709/203 |
| 9,069,627 | B2 | 6/2015 | Ewe |
| 9,300,745 | B2 | 3/2016 | Ewe |
| 2002/0083154 | A1 | 6/2002 | Auffray et al. |
| 2002/0120679 | A1 | 8/2002 | Hayton et al. |
| 2003/0014496 | A1 | 1/2003 | Spencer et al. |
| 2003/0060896 | A9 * | 3/2003 | Hulai ................. G06F 9/4443 700/1 |
| 2003/0193521 | A1 | 10/2003 | Chen et al. |
| 2003/0231750 | A1 | 12/2003 | Janveja et al. |
| 2004/0109011 | A1 | 6/2004 | Peterson, Jr. |
| 2004/0163046 | A1 | 8/2004 | Chu et al. |
| 2004/0216036 | A1 | 10/2004 | Chu et al. |
| 2005/0005259 | A1 * | 1/2005 | Avery ................ G06F 9/5038 717/103 |
| 2006/0041618 | A1 | 2/2006 | Chang |
| 2006/0212846 | A1 * | 9/2006 | O'Farrell .............. G06F 8/20 717/116 |
| 2006/0265662 | A1 | 11/2006 | Gertzen |
| 2007/0094597 | A1 | 4/2007 | Rostom |
| 2007/0112958 | A1 | 5/2007 | Kim |
| 2007/0124670 | A1 | 5/2007 | Finck et al. |
| 2007/0150820 | A1 | 6/2007 | Salvo |
| 2007/0180386 | A1 | 8/2007 | Ballard et al. |
| 2007/0220527 | A1 * | 9/2007 | Tolgu ................ G06F 9/541 719/316 |
| 2007/0234235 | A1 | 10/2007 | Scott |
| 2007/0238488 | A1 | 10/2007 | Scott |
| 2007/0238489 | A1 | 10/2007 | Scott |
| 2007/0256003 | A1 | 11/2007 | Wagoner et al. |
| 2008/0040653 | A1 | 2/2008 | Levine |
| 2008/0072239 | A1 | 3/2008 | Liang et al. |
| 2008/0178073 | A1 | 7/2008 | Gao et al. |
| 2009/0013267 | A1 | 1/2009 | Cudich et al. |
| 2009/0013281 | A1 | 1/2009 | Helfman et al. |
| 2009/0063988 | A1 | 3/2009 | Graeff et al. |
| 2009/0083643 | A1 * | 3/2009 | Beringer .............. G06Q 10/06 715/762 |
| 2009/0158147 | A1 | 6/2009 | Amacker |
| 2009/0204583 | A1 | 8/2009 | Hechler et al. |
| 2009/0228490 | A1 | 9/2009 | Faenger |
| 2009/0318126 | A1 * | 12/2009 | Schimitzek ......... G06Q 10/107 455/419 |
| 2010/0005053 | A1 | 1/2010 | Estes |
| 2010/0005098 | A1 * | 1/2010 | Millmore ............ G06Q 10/105 707/E17.044 |
| 2010/0037237 | A1 * | 2/2010 | Reinart ................ G06F 9/541 719/313 |
| 2010/0049874 | A1 * | 2/2010 | Chene ............ G06F 17/30569 709/246 |
| 2010/0064230 | A1 | 3/2010 | Klawitter et al. |
| 2010/0087179 | A1 | 4/2010 | Makavy et al. |
| 2010/0100823 | A1 | 4/2010 | Ewe et al. |
| 2010/0153866 | A1 * | 6/2010 | Sharoni ............. G06F 9/44526 715/762 |
| 2010/0205530 | A1 * | 8/2010 | Butin .................. G06F 9/4446 715/715 |
| 2011/0111742 | A1 * | 5/2011 | Neil .................. G06F 9/44505 455/414.4 |
| 2011/0113364 | A1 | 5/2011 | Neil et al. |
| 2011/0159916 | A1 * | 6/2011 | Boskovic .......... H04L 67/2823 455/556.1 |
| 2011/0307630 | A1 * | 12/2011 | Lange ................ G06F 8/52 709/246 |
| 2012/0027269 | A1 | 2/2012 | Fidaleo et al. |
| 2012/0110209 | A1 * | 5/2012 | Bonefas ........... H04L 67/2823 709/246 |
| 2012/0137233 | A1 | 5/2012 | Lewontin |
| 2012/0174121 | A1 | 7/2012 | Treat et al. |
| 2012/0229499 | A1 | 9/2012 | Tsao et al. |
| 2012/0266068 | A1 | 10/2012 | Ryman et al. |
| 2013/0041980 | A1 * | 2/2013 | Wickman ............ G06Q 10/06 709/217 |
| 2013/0060845 | A1 * | 3/2013 | Chalana .............. G06Q 10/06 709/203 |
| 2013/0097095 | A1 * | 4/2013 | Rumig ................ G06Q 50/28 705/334 |
| 2013/0103391 | A1 * | 4/2013 | Millmore ............ G06F 17/27 704/9 |
| 2013/0117444 | A1 * | 5/2013 | Sharma .............. G06Q 10/06 709/224 |
| 2013/0253904 | A1 * | 9/2013 | Heller ............ G06F 17/30905 704/8 |
| 2013/0332506 | A1 | 12/2013 | Ewe |

(56) References Cited

U.S. PATENT DOCUMENTS

| | | |
|---|---|---|
| 2014/0033062 A1 | 1/2014 | Ewe |
| 2014/0082511 A1 | 3/2014 | Weissberg et al. |
| 2014/0164497 A1* | 6/2014 | Chalana ............. G06Q 10/06 709/203 |
| 2015/0304458 A1 | 10/2015 | Ewe |
| 2016/0283252 A1 | 9/2016 | Ewe |

FOREIGN PATENT DOCUMENTS

| | | |
|---|---|---|
| WO | 2008031625 A2 | 3/2008 |
| WO | 2010048274 A2 | 4/2010 |
| WO | 2010113160 A1 | 10/2010 |
| WO | 2014018933 A1 | 1/2014 |

OTHER PUBLICATIONS

GuiXT Designer Configuartion Guide, GuiXT.RTM. by Synactive, 2009, Synactive, Inc. Foster City, CA, in 13 pages.
GuiXT Designer Installation Guide, GuiXT.RTM. by Synactive, 2009, Synactive, Inc. Foster City, CA, in 17 pages.
International Preliminary Report on Patentability dated Feb. 5, 2015 for PCTUS2013052403, in 7 pages.
International Preliminary Report on Patentability dated May 5, 2011 for PCT1US20091061469, in 5 pages.
International Search Report and Written Opinion dated May 3, 2010 for PCTUS2009061469.
International Search Report and Written Opinion dated Oct. 31, 2013 for PCTUS20131052403.

* cited by examiner

METHOD AND APPARATUS FOR ACCESSING AN ENTERPRISE RESOURCE PLANNING SYSTEM VIA A MOBILE DEVICE

RELATED APPLICATION

The present application is a continuation of U.S. patent application Ser. No. 15/236,295 filed 12 Aug. 2016 and issued as U.S. Pat. No. 9,661,096, which is a continuation of U.S. patent application Ser. No. 14/981,492 filed 28 Dec. 2015 and issued as U.S. Pat. No. 9,420,054, which is a continuation of U.S. patent application Ser. No. 14/667,583 filed 24 Mar. 2015, and issued as U.S. Pat. No. 9,225,804, which is a continuation of U.S. patent application Ser. No. 13/083,988 filed 11 Apr. 2011, and issued as U.S. Pat. No. 8,990,427, which claims the benefit of U.S. provisional patent application No. 61/342,372, filed 13 Apr. 2010, each of which is incorporated herein by reference in its entirety.

BACKGROUND

Field of the Invention

Embodiments of the present invention generally relate to remote database access and, more particularly, to a method and apparatus for accessing an Enterprise Resource Planning server via a mobile device.

Related Art

Computer systems exist that enable a user to remotely access computer information, e.g., an ERP server. Such ERP servers often use complex client applications to interface with data stored on the ERP server. These complex client applications are typically designed to execute on full desktop computers. As such, mobile devices such as personal digital assistants (PDAs), cellular phones, smart phones, net books, tablet computers, and the like generally lack processing power to effectively run these client applications. These devices also typically lack display panel space and input options, resulting in different usage patterns. Desktop interfaces are typically more complex, varied, and exploratory, while mobile interfaces prioritize quick access and ease of use for a specific purpose.

While specific server applications for converting data into the various communication formats used by these mobile devices may be developed, the myriad of different mobile device formats makes this approach cost prohibitive. Since such devices also lack the processing power needed to execute full database interface applications, there is no effective way for these mobile devices to access these ERP servers. Therefore, there exists a need in the art for a method and apparatus for accessing an enterprise resource planning server via a mobile device.

SUMMARY

Embodiments of the present invention comprise a method and apparatus for accessing an Enterprise Resource Planning ("ERP") server via a mobile device. In one embodiment, the method includes processing data from a host application access application, converting the processed data into an intermediate format that is compatible with a mobile device and communicating the converted data to the mobile device.

In one embodiment, the apparatus comprises a server application for processing data from a host application access application, converting the processed data into an intermediate format that is compatible with a mobile device and communicating the converted data to the mobile device.

In one embodiment, the host application access application performs interface operations with an ERP server. In one embodiment, a native client for the mobile device renders the converted data according to one or more rules.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
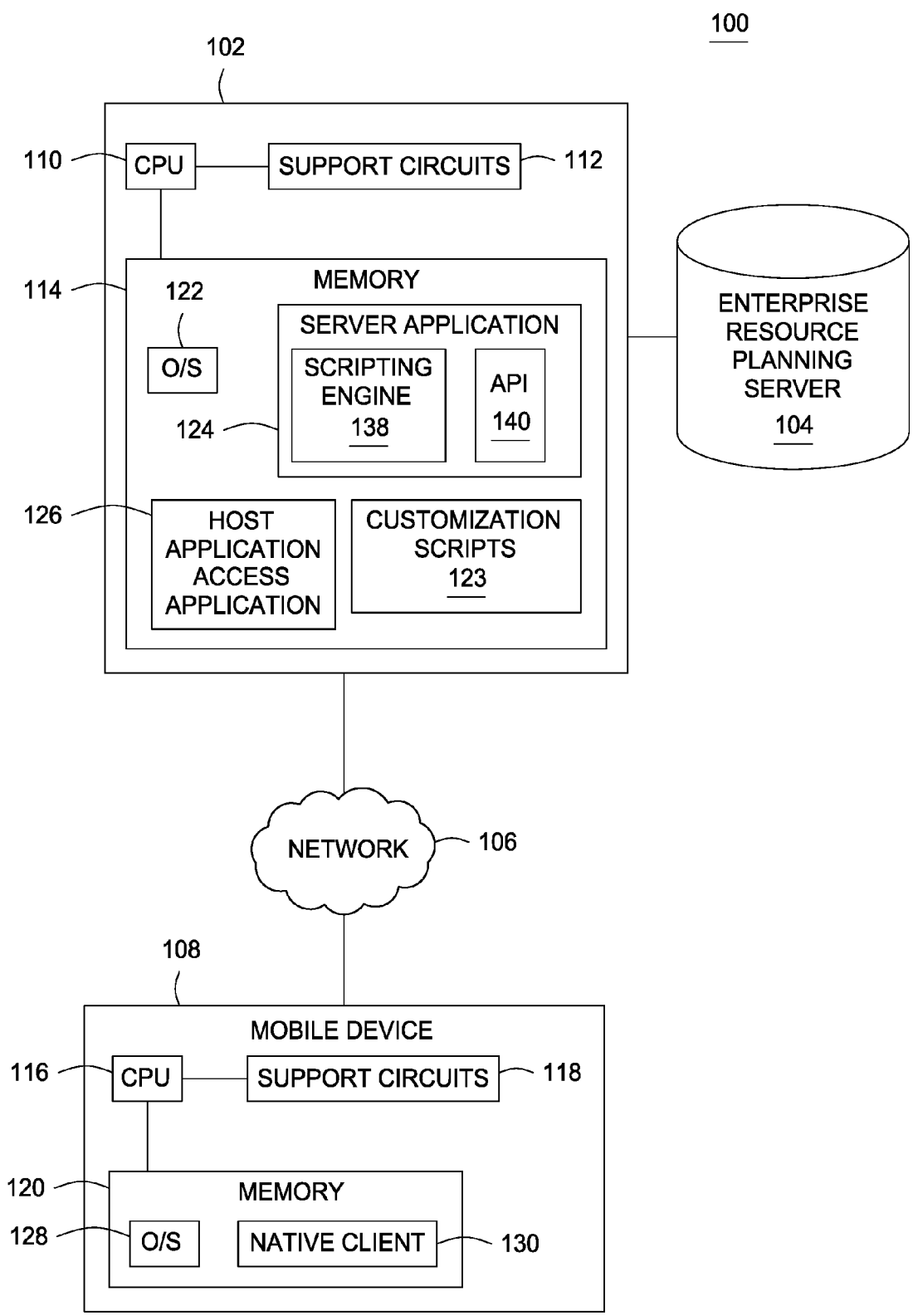
FIG. 1 is a depiction of a block diagram depicting a computer network in which an embodiment of the present invention is used.

FIG. 1 is a block diagram depicting a system 100 for providing an interface for an enterprise resource planning ("ERP") server 104 using a mobile device 108 in accordance with embodiments of the present invention. In some embodiments, the system comprises a server 102, an ERP server 104, a network 106, and a mobile device 108. The server 102 sends and receives data with the ERP server 104 during which the server 102 converts such data to an intermediate format. The server 102 sends the converted data to the mobile device 108 via the network 106.

The server is a computing device such as those generally known in the art. The server 102 comprises a central processing unit (CPU) 110, support circuits 112, and a memory 114. The CPU 110 may comprise one or more commercially available microprocessors or microcontrollers that facilitate data processing and storage. The various support circuits 112 are utilized to facilitate the operation of the CPU 110 and include such circuits as clock circuits, power supplies, cache, input/output circuits and devices, and the like. The memory 114 may comprise random access memory, read only memory, removable storage, optical disk storage, disk drive storage, and combinations thereof. The memory 114 stores an operating system 122, a server application 124, and a host application access application 126. In operation, the CPU 110 executes the operating system 122 to control the general utilization and functionality of the server 102.

The memory 114 also comprises a server application 124. The server application 124 converts data to and from an intermediate format suitable for use by the mobile device 108. The server application 124 also facilitates communication with the mobile device 108 via the network 106. In some embodiments, the server application 124 communicates with the mobile device via the hyper-text transfer protocol (HTTP), but one of ordinary skill in the art would recognize that other application layer protocols such as telnet, secure socket layer (SSL), rlogin, and the like could be used for this purpose. The server application 124 converts data received from the host application access application 126 into an intermediate format suitable to send to the mobile device 108. The server application 124 also converts data received in an intermediate format from the mobile device 108 into a format suitable for transmission to the host application access application 126.

In some embodiments, the server application 124 identifies the particular type of mobile device and creates custom device specific controls for the particular mobile device from the standard interface provided by the host application access application 126. In some embodiments, the server application 124 comprises a scripting engine 138 with a scripting environment/application programming interface ("API") 140 that executes one or more customization scripts 123. These customization scripts 123 modify behavior and screen content prior to conversion and transmission to the native client 130. Optionally, the server application 124 may also preserve sessions across native client invocations; thereby preserving the connection to the ERP system 104.

The memory 114 further comprises a host application access application 126. The host application access application 126 is a front end for the ERP server 104 as commonly known in the art. Such front ends provide access to the data and functionality provided by the ERP server 104. The host application access application 126 sends and receives commands and data to and from the server application 124 in an application server specific format.

The ERP server 104 provides business and/or enterprise management functionality to the host application access application 126. The ERP server 104 may allow a user to access data, execute programs, generate reports, and various other data access and integration tasks as known in the art. In some embodiments, the ERP server 104 is a Systems, Applications, and Products (SAP) server as provided by SAP AG of Walldorf, Germany.

The server 102 is coupled to the mobile device 108 via a network 106. The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure, such as Ethernet, Wi-Fi, WiMax, General Packet Radio Service (GPRS), and the like.

The mobile device 108 is a mobile device as commonly known in the art. Such mobile devices include personal digital assistants (PDAs), cellular phones, smart phones, net books, tablet computers, and the like. In some embodiments, one or more native applications reside on the mobile device 108 to render data received from the server application 124 on the device, to wait for data entry, to take into account interruptions inherent in mobile devices (such as an incoming phone call received by a cellular phone), to perform session continuation after such an interruption, and the like.

The mobile device 108 is comprised of a CPU 116, support circuits 118, and a memory 120. The CPU 116 may comprise one or more commercially available microprocessors or microcontrollers that facilitate data processing and storage. The various support circuits 118 are utilized to facilitate the operation of the CPU 116 and include such circuits as clock circuits, power supplies, cache, input/output circuits and devices, and the like. The memory 120 may comprise random access memory, read only memory, removable storage, optical disk storage, disk drive storage, and combinations thereof. The memory 120 stores an operating system 128, and a native client 130. In operation, the CPU 110 executes the operating system 122 to control the general utilization and functionality of the mobile device 108.

The memory 120 also comprises a native client 130. The native client 130 allows a user to access the ERP server 104 by sending and receiving data and commands to and from the server application 124. The native client 130 is configured to execute on the specific type of mobile platform, such as a particular type of cellular phone or PDA. In some embodiments, the server application 124 alters data sent to the mobile device 108 to a format specific for the interface provided by the mobile device. In some embodiments the native client 130 may execute a series of rules that provides the best interpretation of data sent by the server application 124. For example, rows of buttons might be automatically converted into a table control if the mobile device was an IPHONE provided by APPLE COMPUTERS of Cupertino, Calif. Depending on the customization scripts 123, the native client 130 will render the screen and enable navigation that is native to the mobile device 108. The native client 130 may also utilize an efficient state driven polling loop that utilizes standard HTTP through the network 106. Various native clients 130, tailored for the individual mobile device 108 using custom script interpretations, enable a single version of a customization script 123 to be utilized across a variety of types of mobile devices 108.

Figure 2:
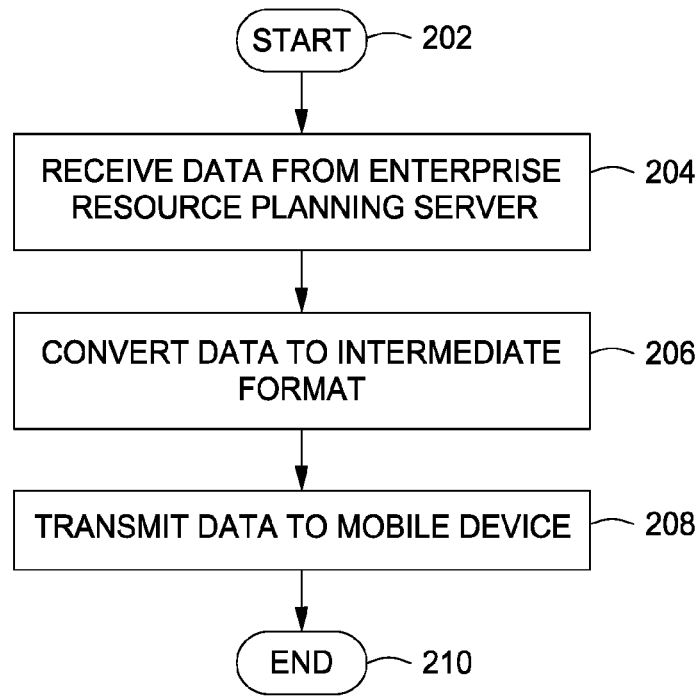
FIG. 2 is a flow diagram of a method for providing an interface to an ERP server for a mobile device in accordance with embodiments of the present invention.

FIG. 2 is a flow diagram depicting a method 200 for providing an interface to an ERP server on a mobile device in accordance with embodiments of the present invention. The method begins at step 202.

At step 204, data is received from the ERP server 104. In some embodiments, this data is received via the host application access application 126 and sent to the server application 124. Such data is typically in a format specific to the ERP server 104 and the host application access application 126. In some embodiments, the server application 124 extracts the data from an interface provided by the host application access application 126, such as by reading values contained within particular fields, accessing transaction logs created by the host application access application 126, or another method as commonly known in the art. Once the data has been extracted and/or received, the method proceeds to step 205.

At step 206, the server application 124 parses and converts the data into an intermediate format. Examples of such an intermediate format include JavaScript Object Notation (JSON) or Extensible Markup Language (XML). By translating the data into an intermediate format, the server application 124 advantageously removes the necessity for the mobile device 108 to translate directly from the host application access application-specific format, a task that traditionally involves a significant amount of processing power. Once the data is translated to the intermediate format, the method proceeds to step 208.

In some embodiments, the server application 124 processes a data stream of ERP data in binary format that is received from the host application access application 126 and recognizes structured data (e.g., name/value pairs, an array of ordered values, a Boolean, a string of characters and/or the like). For example, the server application 124 parses the binary data stream into JavaScript objects by identifying specific markers that signify each new object. The JavaScript objects are suitable for transmission to the mobile phone 108 because such objects are compatible with native mobile applications. The server application 124 builds a data structure (e.g., an array or tree) that stores a list of the JavaScript objects. As an example, each of the JavaScript objects may include customer contact information in the form of attributes (i.e., keys), such as first name, last name, age, phone number (e.g., work and home phone numbers as sub-objects), address and/or the like) having values of various data types.

At step 206, the script engine 138 executes customization scripts 123 that manipulate the data to alter and optimize the user interface that will eventually be presented on the mobile device 108 according to some embodiments. These customization operations may include renaming, adding and deleting data as received by the host application access application 126.

The customization scripts 123 remove various unnecessary fields from an invoice and retain important data fields, such as customer contact information, billing type, sales/delivery documents, payer information and/or the like according to some embodiments. Some data fields are displayed as a list and expandable into more details if desired (i.e., clicked). For example, billing items are listed along with corresponding pricing elements, which can be expanded with long text describing a specific billing item. Action items may be used to select the specific billing item and/or modify any information (e.g., price). In some embodiments, the customization scripts 123 also determine positioning of the data fields and action items on a display screen.

At step 208, the server application 124 transmits the converted data to the mobile device 108. While in the present example the server application 124 is discussed as transmitting the data, one of ordinary skill in the art would recognize that a separate web server executing on the server 102 or another networked computer would also be able to perform the same task. In some embodiments the server application 124 transmits the converted data via HTTP. In some embodiments, the server application 124 may perform additional translation functions depending upon the type of mobile device to which the data will be transmitted. The method ends when the data has been transmitted.

Figure 3:
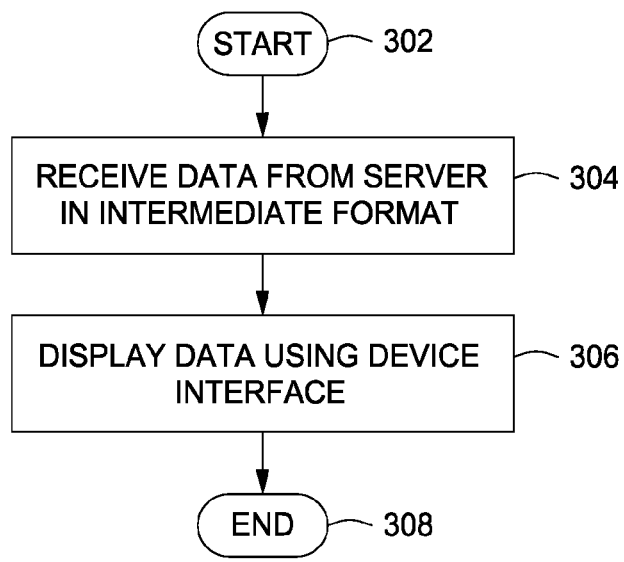
FIG. 3 is a flow diagram of a method for displaying an interface for an ERP server using a mobile device in accordance with embodiments of the present invention.

FIG. 3 is a flow diagram depicting a method 300 for accessing an ERP server using a mobile device in accordance with embodiments of the present invention. The method begins at step 302. At step 304, the native client 130 executing on the mobile device 108 receives converted data from the server 102, where the data is encoded in an intermediate format such as JSON, XML, or the like. At step 306, the native client 130 executes a series of rules to recognize certain constructs (e.g., data structures, such as objects, integers, arrays and/or the like) and render those constructs as native controls on the mobile device, such as the IPHONE example discussed with respect to FIG. 1. The native client 130 uses the converted data to generate an interface for the customization script 123 that is representative of the ERP server 104. In some embodiments, the interface is generated and updated in a manner consistent with commonly assigned U.S. patent application Ser. No. 12/590,760, and/or U.S. patent application Ser. No. 12/288,460, which are herein incorporated by reference.

In some embodiments, the native client 130 displays the converted data on the mobile phone 108 by rendering each object using a native control. Instead of displaying ERP data in an application-specific format on the mobile phone 108, the ERP data is converted into an intermediate format that is recognizable to the native client 130. Accordingly, the native client 130 may utilize one or more native controls (i.e., native mobile applications) to render the converted data locally in order to display the objects in a suitable layout for the mobile phone 108. The native client 130 may configure the converted data as a table of key/value pairs. For example, the native client 130 may display a billing due list of billing items along with each pricing date, billing date and billing document. Furthermore, each billing item is coupled to action items, such as display the billing document, issue the billing document to an accounting department and/or the like. As another example, the native client 130 may render down payment requests for recent sales orders.

At least a portion of the converted data may be augmented with a native operation on the mobile phone. For example, customer contact information may indicate a first name, a last name, an address and at least one phone number, which are displayed in a known or compatible layout (e.g., a mailing address layout or a table format). Furthermore, a particular phone number may be coupled with a link to a function for dialing the particular phone number or a function to save the particular phone number in memory (e.g., a mobile phone book for storing the customer contact information). As another example, clicking on the display or otherwise activating a link associated with the address may execute a map application that produces a real-time map of an area surrounding location associated with the address.

Figure 4:
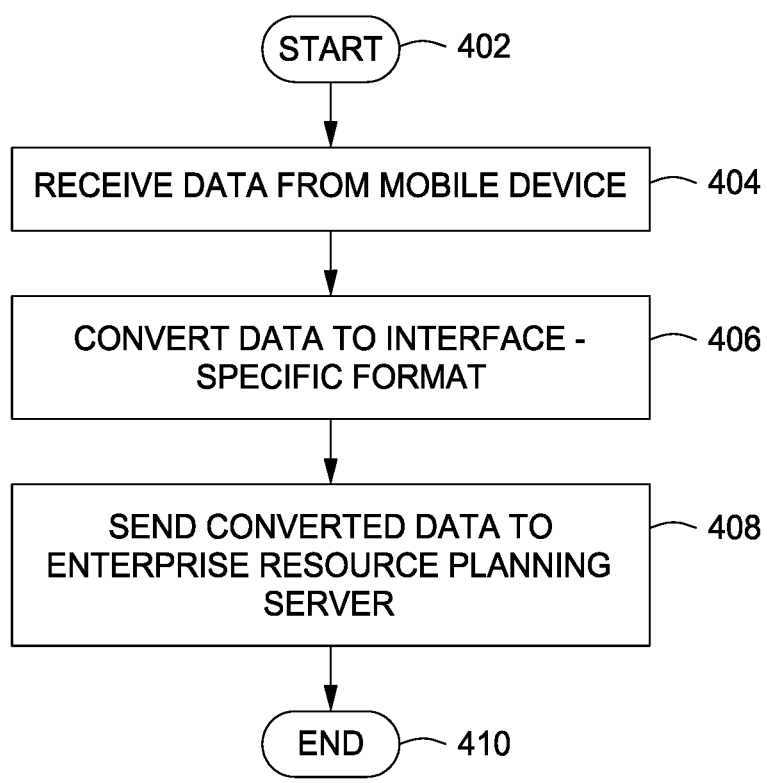
FIG. 4 is a flow diagram of a method for accessing an ERP server using a mobile device in accordance with embodiments of the present invention.

FIG. 4 is a flow diagram depicting a method 400 for forwarding data to an ERP server from a mobile device in accordance with embodiments of the present invention. The method begins at step 402.

At step 404, the server application 124 receives data from the mobile device 108. In some embodiments, the data is received in an intermediate format such as JSON or XML. The data received by the server application may represent various interface commands, operations, or data entry fields, such as mouse clicks, drag-selects, character/data entries, and the like.

At step 406, the data is converted to an interface-specific format as used by the host application access application 126. The server application 124 translates the interface operations received in the intermediate format into the corresponding interface operations performed on the host application access application 126. In some embodiments, the server application 124 may provide these operations transparently such that the host application access application 126 is unaware that the actions are not being performed locally on the server. In some embodiments, the server application 124 may translate the interface operations directly into data entry/access commands that are sent to the host application access application 126, and the host application access application 126 may be aware that said interface operations were performed remotely by a mobile device.

At step 408, the data converted into an interface-specific format is sent to the host application access application 126 for execution and/or access on the ERP server 104. The method ends at step 410 when the interface operations have been sent to the host application access application.

The foregoing description of embodiments of the invention comprises a number of elements, devices, circuits and/or assemblies that perform various functions as described. These elements, devices, circuits, and/or assemblies are exemplary implementations of means for performing their respectively described functions. In some embodiments, the server application 124 represents a means for accessing an enterprise resource planning system via a mobile device. Collectively, the server application 124, the customization scripts 123 and/or the native client 130 may form a means for accessing an enterprise resource planning system via a mobile device.

While the foregoing is directed to embodiments of the present invention, other and further embodiments of the invention may be devised without departing from the basic scope thereof, and the scope thereof is determined by the claims that follow.

What is claimed is:

1. A method, comprising:
    utilizing a processor for converting intermediate format data received from a mobile device into an enterprise resource planning server interface format, the converting the intermediate format data received from the mobile device into the enterprise resource planning server interface format comprises translating interface operations from the intermediate format data received from the mobile device into corresponding interface operations of a host application access application executed on the enterprise resource planning server; and
    providing the converted intermediate format data to the host application access application executed on the enterprise resource planning server.

2. The method of claim 1, further comprising:
    identifying a type of the mobile device; and
    creating one or more native controls for the mobile device type from a standard interface.

3. The method of claim 2, wherein at least one native control comprises a native operation for one of dialing a phone number or saving a phone number in memory or presenting a map associated with an address.

4. The method of claim 1, further comprising preserving a connection to the enterprise resource planning server by preserving one or more sessions.

5. The method of claim 1, wherein the intermediate format is in one of JSON and XML.

6. The method of claim 1, wherein the intermediate format data received from the mobile device is generated from native controls of the mobile device.

7. A non-transitory computer readable medium, storing instructions for executing a process, the instructions comprising:
    converting intermediate format data received from a mobile device into an enterprise resource planning server interface format, the converting the intermediate format data received from the mobile device into the enterprise resource planning server interface format comprises translating interface operations from the intermediate format data received from the mobile device into corresponding interface operations of a host application access application executed on the enterprise resource planning server; and
    providing the converted intermediate format data to the host application access application executed on the enterprise resource planning server.

8. The non-transitory computer readable medium of claim 7, the instructions further comprising:
    identifying a type of the mobile device; and
    creating one or more native controls for the mobile device type from a standard interface.

9. The non-transitory computer readable medium of claim 8, wherein at least one native control comprises a native operation for one of dialing a phone number or saving a phone number in memory or presenting a map associated with an address.

10. The non-transitory computer readable medium of claim 7, the instructions further comprising preserving a connection to the enterprise resource planning server by preserving one or more sessions.

11. The non-transitory computer readable medium of claim 7, wherein the intermediate format is in one of JSON and XML.

12. The non-transitory computer readable medium of claim 7, wherein the intermediate format data received from the mobile device is generated from native controls of the mobile device.

13. An apparatus, comprising:
    a processor, configured to:
        convert intermediate format data received from a mobile device into an enterprise resource planning server interface format, the converting the intermediate format data received from the mobile device into the enterprise resource planning server interface format comprises translating interface operations from the intermediate format data received from the mobile device into corresponding interface operations of a host application access application executed on the enterprise resource planning server; and
        provide the converted intermediate format data to the host application access application executed on the enterprise resource planning server.

14. The apparatus of claim 13, wherein the processor is further configured to:
    identify a type of the mobile device; and
    create one or more native controls for the mobile device type from a standard interface.

15. The apparatus of claim 14, wherein at least one native control comprises a native operation for one of dialing a phone number or saving a phone number in memory or presenting a map associated with an address.

16. The apparatus of claim 13, wherein the processor is further configured to preserve a connection to the enterprise resource planning server by preserving one or more sessions.

17. The apparatus of claim 13, wherein the intermediate format is in one of JSON and XML.

18. The apparatus of claim 13, wherein the intermediate format data received from the mobile device is generated from native controls of the mobile device.

* * * * *